(12) United States Patent
Mizoguchi et al.

(10) Patent No.: US 8,550,510 B2
(45) Date of Patent: Oct. 8, 2013

(54) VEHICLE BUMPER

(75) Inventors: Hiroo Mizoguchi, Hamamatsu (JP); Yusuke Yamashita, Hamamatsu (JP)

(73) Assignee: Suzuki Motor Corporation, Hamamatsu (JP)

( * ) Notice: Subject to any disclaimer, the term of this patent is extended or adjusted under 35 U.S.C. 154(b) by 0 days.

(21) Appl. No.: 13/475,663

(22) Filed: May 18, 2012

(65) Prior Publication Data

US 2012/0292931 A1   Nov. 22, 2012

(30) Foreign Application Priority Data

May 20, 2011   (JP) ................................. 2011-114041

(51) Int. Cl.
*B60R 19/02* (2006.01)

(52) U.S. Cl.
USPC .......................................... 293/126; 296/208

(58) Field of Classification Search
USPC ................... 293/102, 120–122, 126; 296/208
See application file for complete search history.

(56) References Cited

U.S. PATENT DOCUMENTS

| | | | | |
|---|---|---|---|---|
| 5,288,117 A | * | 2/1994 | Vogelgesang | 293/117 |
| 5,957,512 A | * | 9/1999 | Inada et al. | 293/102 |

FOREIGN PATENT DOCUMENTS

| | | | |
|---|---|---|---|
| JP | 01-63557 | | 4/1989 |
| JP | 05-005609 | | 1/1993 |
| JP | HEI 5-5609 | * | 1/1993 |
| JP | 05-049575 | | 6/1993 |
| JP | 07-052733 | | 2/1995 |
| JP | 09-201840 | | 8/1997 |
| JP | 09-201841 | | 8/1997 |
| JP | 10-297397 | | 11/1998 |
| JP | 2000-006714 | | 1/2000 |
| JP | 2001-277965 | | 10/2001 |
| JP | 2003-127809 | | 5/2003 |
| JP | 2003-311770 | | 11/2003 |
| JP | 2006-008021 | | 1/2006 |
| JP | 2006-082729 | | 3/2006 |
| JP | 2006-199093 | | 8/2006 |
| JP | 2007-099076 | | 4/2007 |
| JP | 2007-153199 | | 6/2007 |
| JP | 2007-168636 | | 7/2007 |
| JP | 2007-253898 | | 10/2007 |
| JP | 2007-276659 | | 10/2007 |
| JP | 2007-326481 | | 12/2007 |
| JP | 2009-274635 | | 11/2009 |
| JP | 2010-030491 | | 2/2010 |
| JP | 2010-173561 | | 8/2010 |
| JP | 2010-173596 | | 8/2010 |

* cited by examiner

*Primary Examiner* — Dennis Pedder
*Assistant Examiner* — Beverly Becker
(74) *Attorney, Agent, or Firm* — Silicon Valley Patent Group LLP

(57) ABSTRACT

A vehicle bumper is provided that can increase the rigidity while ensuring a superior drainage capability in the vicinity of the location where the bumper is attached to a side face member. A vehicle bumper includes a middle portion extending in vehicle width direction, two lateral portions extending from the two ends of the middle portion towards side face members (front fender panels), an upper flange protruding inward, with respect to a vehicle body, from an upper edge of the lateral portions, an attachment flange that is continuous with the upper flange near an end of the lateral portions and protruding further inside the vehicle body than the upper flange, a long groove formed by a depression in an upper face of the upper flange, at least one rib that partitions the long groove in vehicle width direction into depressions, and water drainage holes formed in the depressions.

5 Claims, 4 Drawing Sheets

VIEW ON ARROW D

E-E

F-F

VEHICLE BUMPER

CROSS-REFERENCE TO RELATED APPLICATIONS

This application is based upon and claims the benefit of priority from the prior Japanese Patent Application No. 2011-114041, filed on May 20, 2011, the entire contents of which are incorporated herein by reference.

BACKGROUND OF THE INVENTION

I. Field of the Invention

The present invention relates to a vehicle bumper constituting a front face or a rear face of a vehicle.

II. Description of the Related Art

Bumpers constituting a front face or a rear face of a vehicle ("front bumper" in case of the front face and "rear bumper" in case of the rear face) are attached to members constituting the side faces of the vehicle (referred to as "side face members" below). For example, the front bumper is attached to front fender panels constituting the side faces of the vehicle front portion, whereas the rear bumper is attached to side body panels constituting the side faces of the vehicle rear portion.

Ordinarily, those portions of the lateral edges of the bumpers that are located near the wheels are curved so as to accommodate the shape of the wheels, and form a wheel arch together with the curved edge with which the side face member is provided as well. Thus, since the bumper is a member that is arranged near the wheels, mud water that is drawn up by the wheels when driving in rainy weather may intrude into the bumper. And depending on the head wind, rain water flowing through gaps at the lamps arranged above the bumper or at the side face members connected to the bumpers may also intrude into the bumper. Mud water or rain water (simply referred to as "water" below) intruding into the bumper may become a cause of rust, if it accumulates inside the bumper, in particular at a portion connected to the side face members, and if it flows down along the surface of the bumper, it dirties that portion.

To address this issue, in Japanese Utility Model Laid-open Publication No. Hei 5-5609, cut-outs are formed in flange portions of a bumper fascia (bumper) at an attachment structure of a bumper side to which various flanges of the bumper fascia and a fender panel (side face member) are vertically tightened, and sealing rubbers are arranged between the fender panels and the bumper fascia. The outer side edges of the sealing rubbers are arranged such that grooves are formed that are arranged further to the vehicle inward side than the outer sides of the sealing rubbers. According to Japanese Utility Model Laid-open Publication No. Hei 5-5609, water that flows through these grooves is drained downward from the cut-outs, so that it can be prevented that this water drips along the outer surface of the bumper fascia.

Now, ordinarily, the bumper is provided with flanges that are used to attach it to the side face members, as in Japanese Utility Model Laid-open Publication No. Hei 5-5609. Thus, when flanges are erected extending from the walls on the inner side of the bumper towards the inner side with respect to the vehicle interior, sink marks may be generated in the wall on the outer side of the bumper. Therefore, and even though this is not mentioned in detail in Japanese Utility Model Laid-open Publication No. Hei 5-5609, if flanges are provided as noted above, a portion of the walls at the base of the flanges may be removed. Thus, the generation of sink marks can be suppressed, and it is possible to maintain a favorable outer design appearance of the bumper.

However, when a portion of the walls is removed, then the rigidity will of course decrease in the vicinity thereof, so that when the bumper is fastened to the side face members (the vehicle body), there is the risk that the flanges are deformed due to the load of the bumper. Consequently, it is necessary to provide a structure, for example a rib, for enhancing the rigidity near the location where a portion of the wall has been removed. However, if such a rib is provided, then there is the risk that this blocks the drainage path for draining water, lowering the drainage capability. Thus, it is necessary to provide a new drainage hole to ensure the drainage capability, and forming this drainage hole, in turn, lowers the rigidity. Thus, in conventional bumpers, it has been difficult to achieve both superior drainage capability and rigidity at the same time.

In view of the foregoing problems, it is an object of the present invention to provide a vehicle bumper with which an increased rigidity can be achieved while ensuring a superior drainage capability in the vicinity of the location where the bumper is attached to the side face member.

SUMMARY OF THE INVENTION

A vehicle bumper is provided that can increase the rigidity while ensuring a superior drainage capability in the vicinity of the location where the bumper is attached to a side face member. A vehicle bumper includes a middle portion extending in vehicle width direction, two lateral portions extending from the two ends of the middle portion towards side face members (front fender panels), an upper flange protruding inward, with respect to a vehicle body, from an upper edge of the lateral portions, an attachment flange that is continuous with the upper flange near an end of the lateral portions and protruding further inside the vehicle body than the upper flange, a long groove formed by a depression in an upper face of the upper flange near the attachment flange along the upper edge of the lateral portions, at least one rib that partitions the long groove in vehicle width direction into a plurality of depressions, and a plurality of water drainage holes formed respectively in the plurality of depressions.

In order to solve the above-described problems, in one representative configuration, a vehicle bumper according to one aspect of the present invention includes a middle portion extending in vehicle width direction, the middle portion being attached to a front face or a rear face of a vehicle, two lateral portions extending from the two ends of the middle portion towards side face members constituting side faces of the vehicle, an upper flange protruding inward, with respect to a vehicle body, from an upper edge of the lateral portions, an attachment flange that is continuous with the upper flange near an end of the lateral portions and protruding further inside the vehicle body than the upper flange, the attachment flange being attached to the side face members, a long groove formed by a depression in an upper face of the upper flange near the attachment flange along the upper edge of the lateral portions, at least one rib that partitions the long groove in vehicle width direction into a plurality of depressions, and a plurality of water drainage holes formed respectively in the plurality of depressions.

With this configuration, the upper flange formed at the lateral portions of the vehicle bumper (referred to below simply as "bumper") is continuous with the attachment flange serving as the location where the bumper is attached to the side face member. Therefore, the attachment flange is supported by the upper flange, and the load acting on the attachment flange can be distributed to the upper flange. Consequently, it is possible to increase the rigidity of the attachment flange. Since a long groove is provided in the upper flange at the base portion of this attachment flange, that is to say, since a wall portion is removed with this long groove, the generation of sink marks in the outer surface of the bumper is suppressed. Moreover, with a rib formed in this long groove, the rigidity, which tends to be lowered by the long groove, is enhanced. Moreover, water drainage holes are respectively formed in the plurality of depressions (regions) into which the long groove is partitioned by the rib. Consequently, it is possible to ensure a suitable drainage path even if the rib is provided, and it is possible to drain water through the water drainage holes in the long groove to the outside of the bumper. Thus, it is possible to achieve an increased rigidity while ensuring a superior drainage capability in the vicinity of the location where the bumper is attached to the side face member.

The attachment flange may have a screw hole into which a screw can be inserted that is used when attaching the vehicle bumper to the side face members, and at least one of the ribs may be arranged at a position that overlaps the screw hole when viewed from the side of the vehicle body.

With this configuration, the rib and the screw hole are next to each other in the vehicle width direction. Consequently, it is possible to increase the rigidity with the rib not only in the vicinity of the long groove (water drainage holes), but also in the vicinity of the screw hole.

The attachment flange may have a tapered shape whose thickness decreases towards the inner side with respect to the vehicle body. Thus, if the bumper is attached to the side face member using a bumper holder, the bumper holder can be easily mounted to the attachment flange of the bumper.

The attachment flange and the upper flange near the attachment flange may be tilted downward when following the direction towards a center in the vehicle length direction, and the plurality of water drainage holes may be formed on the side of the center in the vehicle length direction within the plurality of depressions.

That the attachment flange and the upper flange near the attachment flange are tilted downward when following the direction towards a center in the vehicle length direction means that the break line of the bumper is tilted downward. In this case, if a plurality of water drainage holes are formed on the side of the center in the vehicle length direction within the plurality of long grooves, then these water drainage holes are provided at the lowest positions within the long groove. Thus, the water that has reached the long groove can easily reach the water drainage holes, so that the water drainage efficiency can be raised.

The vehicle bumper may further comprise a lateral flange that protrudes from an end of the lateral portions, which form a wheel arch, towards the inner side with respect to the vehicle body, and the attachment flange may comprise a sagging flange that protrudes downward from an edge on the side of the center in the vehicle length direction, and that is continuous with the lateral flange.

With this configuration, the load acting on the attachment flange can be dispersed via the sagging flange to the lateral flange, so that the rigidity of the attachment flange can be increased even further. In particular, that the sagging flange is continuous with the lateral flange formed at the lateral edge of the bumper means that the sagging flange is positioned near that depression, into which the long groove has been partitioned by the rib, that is on the side of the lateral edge of the bumper. Consequently, it is possible to increase the strength of the depression that is close to the lateral edge of the bumper, that is, the depression that is close to the wheel and thus on the side where mud water tends to intrude as well as the strength in the vicinity of the water drainage hole in that depression, so that it is possible to enlarge this water drainage hole, and to enhance the drainage of mud water.

According to some aspects of the present invention, it is possible to provide a vehicle bumper with which an increased rigidity can be achieved while ensuring a superior drainage capability in the vicinity of the location where the bumper is attached to the side face member.

DETAILED DESCRIPTION OF THE INVENTION

Figure 1:
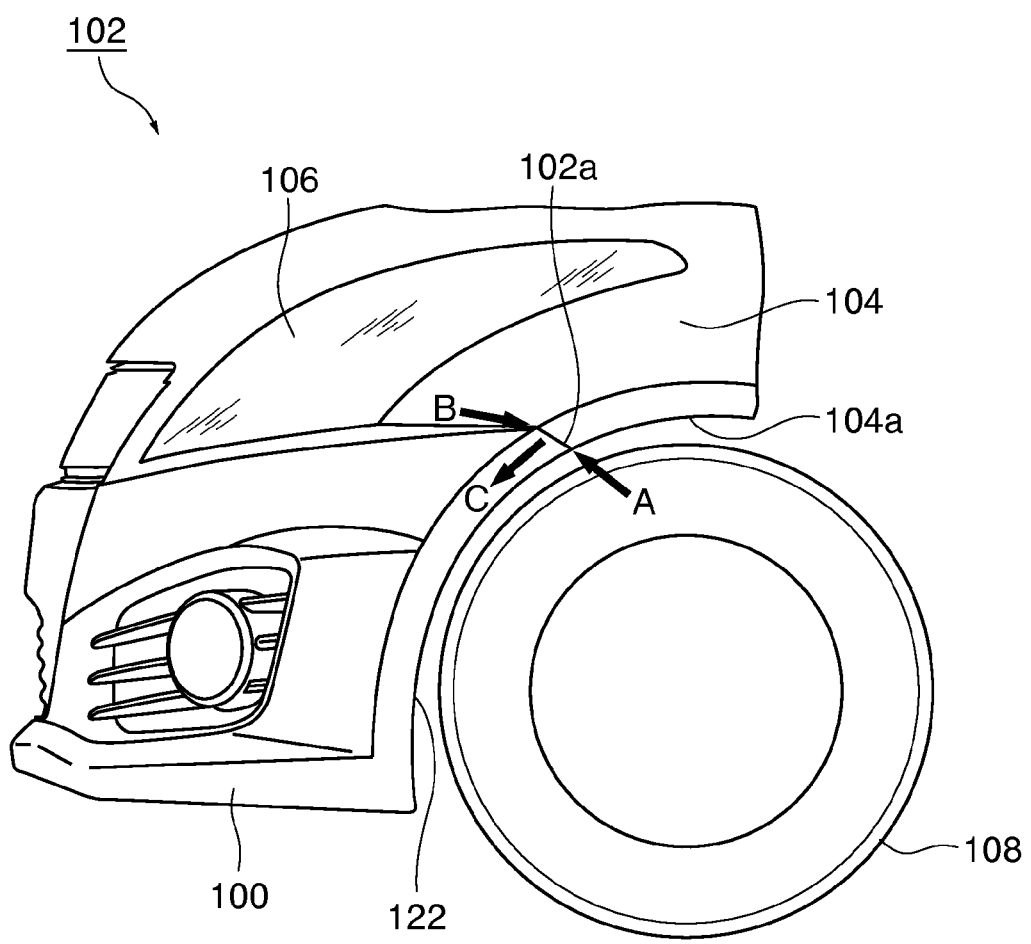
FIG. 1 is a lateral view of a vehicle body provided with a vehicle bumper according to the present embodiment.

Referring to the accompanying drawings, the following is a detailed explanation of preferred embodiments of the invention. The dimensions, materials, and other specific numerical values described in this embodiment are merely examples for facilitating the understanding of the present invention, and are not to be construed as limiting the invention unless otherwise stated. It should be noted that elements constituting substantially identical functions and configurations are denoted by identical reference numerals in the present specification and the drawings, and hence are not described in duplicate. Also, illustration of elements that are not directly relevant to the present invention has been omitted.

FIG. 1 is a lateral view of a vehicle body 102 provided with a vehicle bumper according to the present embodiment. As shown in FIG. 1, the vehicle bumper (referred to below as bumper 100) according to this embodiment is a front bumper that constitutes a front face at the front portion of the vehicle body 102. Note that in the present embodiment, a front bumper is illustrated as an example of the bumper 100, but there is no limitation to this, and the form of the bumper 100 may also be applied to a rear bumper constituting a rear face at the rear portion of the vehicle body 102.

At the front portion of the vehicle body 102 shown in FIG. 1, the bumper 100 is attached to a front fender panel 104, which serves as a side face member constituting a side face of the vehicle body 102. Moreover, a headlamp 106 is arranged above the bumper 100 and at the front end of the front fender panel 104.

It should be noted that in FIG. 1, the face serving as the right side of the vehicle body 102 when viewing the vehicle body 102 head on is shown as an example, and the following explanations relate to this side, but the face serving as the left side has the same configuration with bilateral symmetry. Moreover, in this embodiment, the front fender panel 104 is shown as an example of the side face member, but there is no limitation to this, and it is also possible that the side face member is changed as appropriate in accordance with the layout of the vehicle body. For example, if the form of the bumper 100 is applied to the rear bumper, then it is also possible to take a side body panel (not shown in the drawings) as the side face member.

In the bumper 100, the edge (referred to below as "terminal edge 122") at the end of a lateral portion 120a (see FIG. 2) that is explained later is curved in accordance with the shape of a wheel 108. Also a lower edge 104a of a front fender panel 104 is curved in accordance with the shape of the wheel 108. The terminal edge 122 and the lower edge 104a form a wheel arch.

Thus, the bumper 100 is a member that is arranged near the wheel 108. Therefore, mud water that is drawn up by the wheels 108 when driving in rainy weather may intrude from direction A into the bumper 100 or a joint portion 102a joining the bumper 100 and the headlamp 106. And depending on the head wind, rain water flowing through the gap at the headlamp 106 or the front fender panel 104 may also intrude into the joint portion 102a or the bumper 100 from the direction B. This mud water or rain water (water) may become a cause of rust, if it accumulates at the joint portion 102a, and it may dirty the surface of the bumper 100 if it flows down in the direction C. Consequently, superior drainage capabilities are desired near the joint portion 102a, that is, near the end portion of the lateral portion 120a of the bumper 100 (within the region indicated by the long-dash-short-dash line in FIG. 2).

Figure 2:
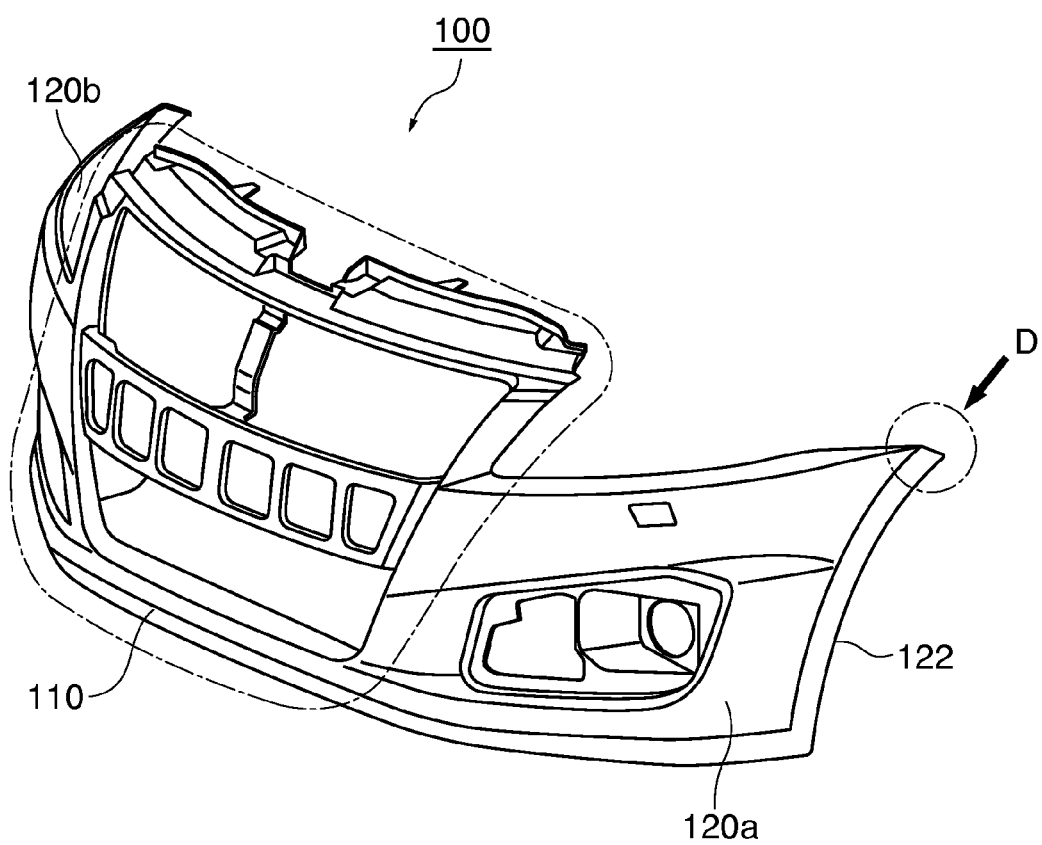
FIG. 2 is a front perspective view of the bumper in FIG. 1.

FIG. 2 is a front perspective view of the bumper 100 in FIG. 1. As shown in FIG. 2, the bumper 100 includes a middle portion 110 (the region enclosed by the long-dash-short-dash line), and two lateral portions 120a and 120b. The middle portion 110 is a region that extends in the width direction of the vehicle and is attached to the front face of the vehicle body 102 (to the rear face if the bumper 100 is a rear bumper). The lateral portions 120a and 120b are parts that extend from respective ends of the middle portion 110 towards the front fender panels 104 (side face members).

Figure 3:
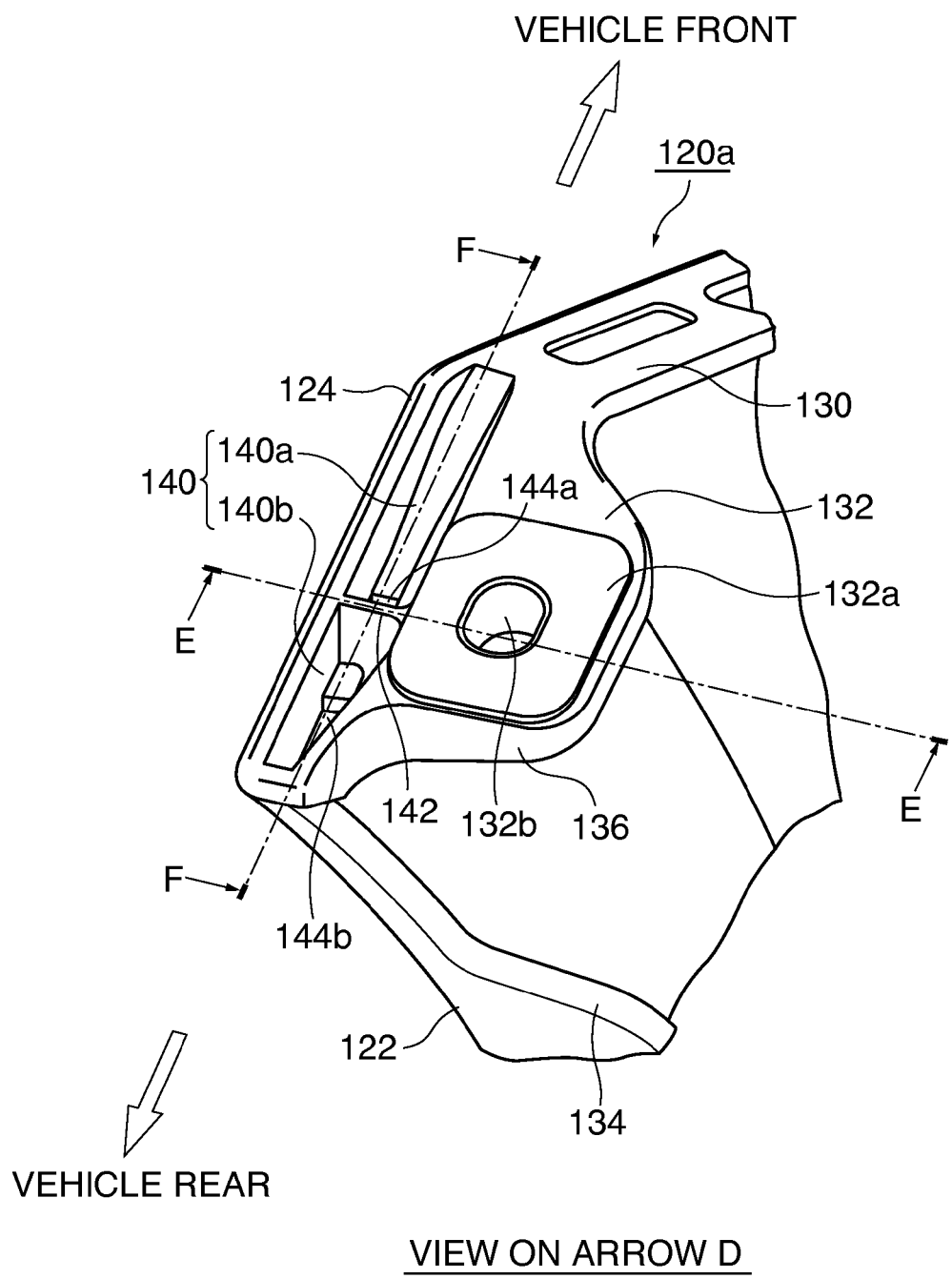
FIG. 3 is a perspective view of the region within the broken line in FIG. 2, taken from direction D.
Figure 4A:
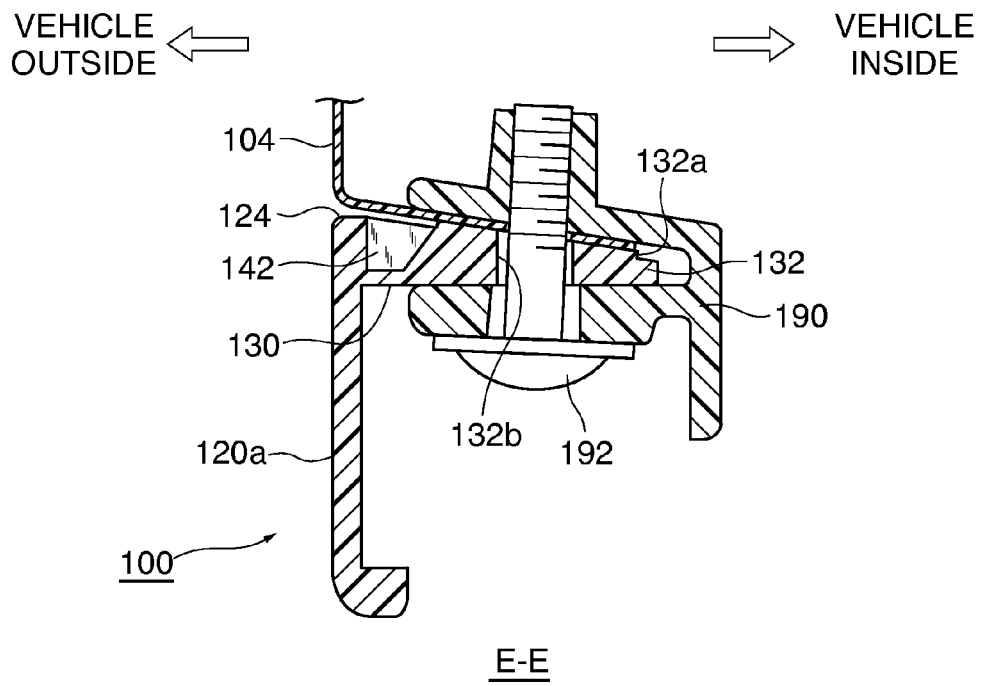
FIGS. 4A and 4B are cross-sectional views of FIG. 3.
Figure 4B:
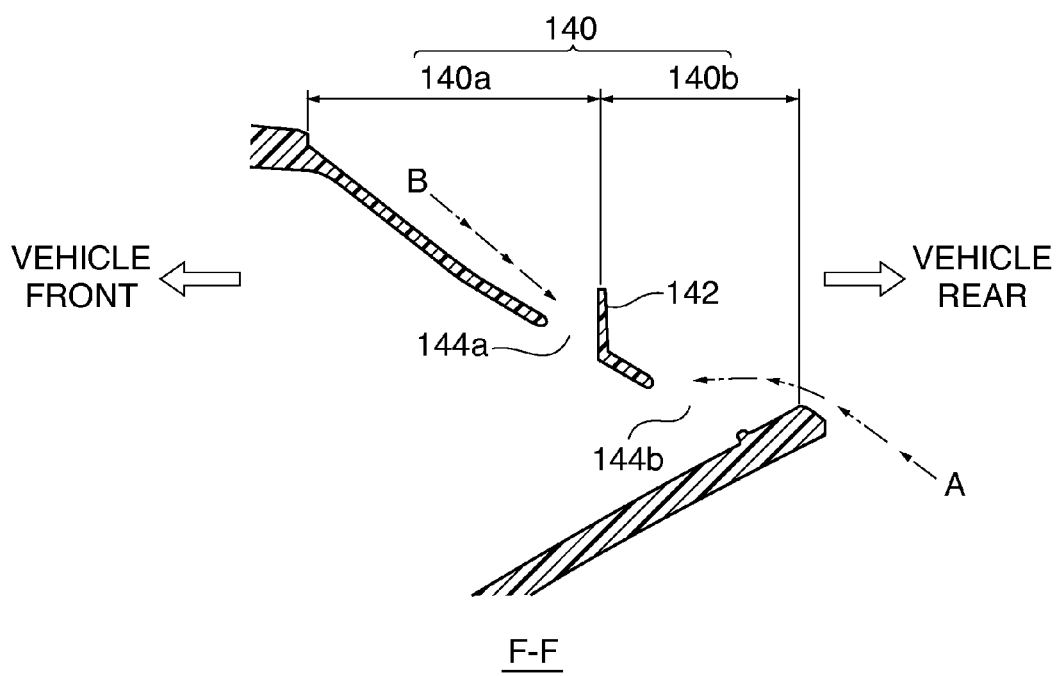

FIG. 3 is a perspective view of the region within the broken line in FIG. 2 viewed from the direction D. FIGS. 4A and 4B are cross-sectional views of FIG. 3, with FIG. 4A being a cross-sectional view along E-E in FIG. 3, and FIG. 4B being a cross-sectional view along F-F in FIG. 3. It should be noted that to facilitate understanding, FIG. 4A shows a state in which a bumper holder 190 and a screw 192 are attached to the lateral portion 120a (strictly speaking, to an attachment flange 132), and the bumper 100 is attached to the front fender panel 104.

As shown in FIG. 3, at an upper edge 124 of the lateral portion 120a, an upper flange 130 is formed that protrudes towards the inner side of the vehicle body from that upper edge 124. And at the terminal edge 122 of the lateral portion 120a, a lateral flange 134 is formed that protrudes towards the inner side of the vehicle body from that terminal edge 122. Thus, it is possible to improve the rigidity of the lateral portion 120a.

An attachment flange 132 that protrudes further to the inner side of the vehicle body than that upper flange 130 is provided continuous to the upper flange 130, near the end of the lateral portion 120a. The attachment flange 132 is an attachment location used when attaching the end of the bumper 100 (end of the lateral portion 120a) to the front fender panel 104. Thus, by making the attachment flange 132 continuous to the upper flange 130, it is possible to distribute the entire load of the bumper 100 acting on the attachment flange 132 over the upper flange 130, making it possible to increase the rigidity of the attachment flange 132.

Moreover, as shown in FIGS. 3 and 4A, the attachment flange 132 includes an attachment seating face 132a whose upper surface protrudes upward. Substantially in the middle of this attachment seating face 132a, a screw hole 132b is formed into which a screw 192 can be inserted that is used when attaching the bumper 100 to the front fender panel 104 (side face member). Thus, the bumper 100 can be attached to the front fender panel 104 by first abutting the attachment seating face 132a of the attachment flange 132 against the front fender panel 104, and then fitting the bumper holder 190 and inserting the screw 192 into the screw hole 132b.

Furthermore, in the present embodiment, the attachment flange 132 is provided with a so-called wedge shape, that is, a tapered shape whose thickness decreases towards the inner side with respect to the vehicle body, as shown in FIG. 4A. Thus, if the bumper holder 190 is used when attaching the bumper to the front fender panel 104 as described above, it is easy to fit the bumper holder 190 to the attachment flange 132.

Here, when the upper flange 130 pointing towards the inner side with respect to the vehicle body is formed to the inner side of the upper edge 124, as described above, then a sink mark may be formed on the outer surface of the lateral portion 120a, disturbing the outer design appearance. To address this issue, in the present embodiment, a long groove 140 is formed by forming a depression in the upper face of the upper flange 130 near the attachment flange 132 along the upper edge 124 of the lateral portion 120a, as shown in FIG. 3, removing a portion of the upper face of the upper flange 130. Through this removal of a portion of the upper face of the upper flange 130, the generation of sink marks in the outer wall of the bumper 100 is suppressed.

However, when a portion of the wall is removed, then the rigidity tends to be lowered in a vicinity thereof. Accordingly, in the present embodiment, a rib 142 that is erected between the wall on the outer side and the wall on the inner side with respect to the vehicle body is formed inside the long groove 140. Thus, it is possible to suppress a lowering of the rigidity due to removing a portion of the wall, and it becomes possible to ensure the strength of the upper flange 130 and the attachment flange 132 near the long groove 140.

Moreover, in the present embodiment, the rib 142 is arranged at a position at which it overlaps with the screw hole 132b when viewed from the side of the vehicle body, as shown in FIGS. 3 and 4A. In other words, the rib 142 and the screw hole 132b are arranged on substantially the same line in the vehicle width direction. Thus, since the rib 142 and the screw hole 132b are arranged next to each other in the vehicle width direction, the rigidity not only near the long groove 140 but also near the screw hole 132b can be increased with the rib 142.

It should be noted that in the present embodiment, there is only one rib 142 within the long groove 140, but this configuration is merely an example, and the number of ribs 142 may be modified as suitable in accordance with the strength that is desired for the upper flange 130 and the attachment flange 132 near the long groove 140. Moreover, if a plurality of ribs 142 are provided, then at least one of them should be arranged at a position that overlaps the screw hole 132b when viewed from the side of the vehicle body.

If the rib 142 is provided as described above, the long groove 140 is partitioned in the vehicle width direction and is split into a plurality of depressions 140a and 140b. Water drainage holes 144a and 144b are respectively formed in the plurality of depressions 140a and 140b. Thus, even if the rib 142 is provided in the long groove 140, the water drainage path is not blocked, and water that has entered the long groove 140 can be drained to the outside of the bumper 100 through the water drainage holes 144a and 144b. Consequently, it is possible to improve the rigidity and to ensure a superior drainage capability near the attachment flange 132, that is, near the end of the lateral portion 120a of the bumper 100.

In particular, in the present embodiment, the attachment flange 132 and the upper flange 130 near it are tilted downward when following the direction towards the center in the vehicle length direction. That is to say, the break line at the end of the bumper 100 is tilted downward when following the direction towards the center in the vehicle length direction. In this case, the plurality of water drainage holes 144a and 144b are formed on the side towards the center in the vehicle length direction within the depressions 140a and 140b.

More specifically, the bumper 100 of the present embodiment is a front bumper, so that the bumper 100 is arranged at the front of the vehicle body 102. Consequently, the side of the bumper 100 facing towards the center in the vehicle length direction is the rear side in the front-aft-direction of the vehicle body (referred to as "vehicle body rear side" below). Therefore, the attachment flange 132 and the upper flange 130 near it are tilted downward when following the direction towards the vehicle body rear side, as shown in FIG. 3, so that the break line (the vicinity of the joint portion 102a) at the end of the bumper 100 is tilted downward when following the direction towards the vehicle body rear side (see FIG. 1).

Accordingly, in the bumper 100 of the present embodiment, the water drainage holes 144a and 144b are each formed on the side towards the vehicle body rear side within the depressions 140a and 140b, as shown in FIG. 4B. Therefore, the water drainage holes 144a and 144b are respectively arranged at the lowest location within the depressions 140a and 140b. Thus, water that has intruded from the direction B into the depression 140a can easily reach the water drainage hole 144a, and water that has intruded from the direction A into the depression 140b can easily reach the water drainage hole 144b, so that the drainage efficiency can be increased.

As described above, the water drainage hole 144a contributes to the drainage of water from the direction B, that is, of rain water, and the water drainage hole 144b contributes to the drainage of water from the direction A, that is, of mud water. The rain water and the mud water should of course both be drained to the outside of the bumper 100, but since sand, mud and the like may be mixed into the mud water, it is necessary to promote in particular the drainage of mud water. Concerning this requirement, if the water drainage holes 144a and 144b are arranged separately as in the present embodiment, then it is easy to adjust the drainage capabilities since it is possible to enlarge only the water drainage hole 144b. The size of the water drainage hole 144a, which does not need to be enlarged, can be maintained as it is, and the lowering of the rigidity caused by this water drainage hole can remain at the necessary minimum.

Here, if the water drainage holes 144a and 144b are provided in the depressions 140a and 140b as described above, and in particular if the water drainage hole 144b is widened, then there is the possibility that the rigidity in the vicinity thereof is slightly reduced. Therefore, in the present embodiment, the attachment flange 132 is provided with a sagging flange 136 that protrudes downward from the edge on the center side, in vehicle length direction, of the attachment flange 132 (to the rear of the vehicle body in the present embodiment), and this sagging flange 136 is continuous with the lateral flange 134.

The sagging flange 136 formed at the edge on the vehicle body rear side of the attachment flange 132 is positioned in the vicinity of the depression 140b on the vehicle body rear side near the terminal edge 122 of the bumper 100, with respect to the plurality of depressions 140a and 140b of the long groove 140. Therefore, with the sagging flange 136, it is possible to increase the rigidity in the vicinity of the depression 140b and its water drainage hole 144b close to the terminal edge 122 of the bumper 100, that is, on the side that is close to the wheel 108 (see FIG. 1) and into which mud water tends to intrude. Consequently, even when the water drainage hole 144b is enlarged, it is possible to enhance the rigidity, which has the tendency of being lowered when enlarging the water drainage hole 144b. Moreover, by making the sagging flange 136 continuous to the lateral flange 134, it is possible to distribute the load of the bumper 100 acting on the attachment flange 132, due to attaching the bumper 100 to the front fender panel 104, via the sagging flange 136 to the lateral flange 134, and to achieve a further increase of the rigidity of the attachment flange 132.

As described above, with the bumper 100 (vehicle bumper) according to the present embodiment, the upper flange and the attachment flange 132 of the lateral portion 120a are continuous, so that the rigidity at the location for the attachment to the front fender panel 104 (side face member) is increased. Moreover, while suppressing the generation of sink marks in the outer surface of the bumper 100 due to some of the wall of the upper flange 130 at the base portion of the attachment flange 132 being removed with the long groove 140, it is possible to suppress a lowering of the rigidity due to the removal of some of the wall with the rib 142 that is formed within the long groove 140. Since the water drainage holes 144a and 144b are respectively formed in the depressions 140a and 140b of the long groove 140, water can be suitably drained through the water drainage holes 144a and 144b to the outside of the bumper 100. Consequently, an increased rigidity can be achieved while ensuring a superior drainage capability in the vicinity of the location where the bumper is attached to the side face member.

While a preferred embodiment of the present invention has been described above with reference to the accompanying drawings, it should be appreciated that the present invention is not limited to the embodiment shown above. It will be apparent for a person skilled in the art that various modifications and variations may be made within the scope of the invention as defined in the appended claims, and those modifications and variations should be understood to be included within the technical scope of the present invention.

The present invention can be applied to vehicle bumpers constituting a front face or a rear face of a vehicle.

What is claimed is:

1. A vehicle bumper comprising:
   a middle portion extending in vehicle width direction, the middle portion being attached to a front face or a rear face of a vehicle;
   two lateral portions extending from two ends of the middle portion towards side face members constituting side faces of the vehicle;
   an upper flange protruding inward, with respect to a vehicle body, from an upper edge of the two lateral portions;
   an attachment flange that is continuous with the upper flange near an end of the two lateral portions and protruding further inside the vehicle body than the upper flange, the attachment flange being attached to the side face members;
   a long groove formed by a depression in an upper face of the upper flange near the attachment flange along the upper edge of the two lateral portions;
   at least one rib that partitions the long groove in the vehicle width direction into a plurality of depressions; and
   a plurality of water drainage holes formed respectively in the plurality of depressions.

2. The vehicle bumper according to claim 1, wherein:
   the attachment flange has a screw hole into which a screw can be inserted that is used when attaching the vehicle bumper to the side face members; and
   at least one of the at least one rib is arranged at a position that overlaps the screw hole when viewed from a side of the vehicle body.

3. The vehicle bumper according to claim 1, wherein the attachment flange has a tapered shape whose thickness decreases towards the inner side with respect to the vehicle body.

4. The vehicle bumper according to claim 1, wherein:
the attachment flange and the upper flange near the attachment flange are tilted downward when following a direction towards a center in a vehicle length direction; and
the plurality of water drainage holes are formed on the side of the center in the vehicle length direction within the plurality of depressions.

5. The vehicle bumper according to claim 1, wherein:
the vehicle bumper further comprises a lateral flange that protrudes from the end of the two lateral portions, which form a wheel arch, towards the inner side with respect to the vehicle body; and
the attachment flange comprises a sagging flange that protrudes downward from an edge on the side of a center in a vehicle length direction, and that is continuous with the lateral flange.

\* \* \* \* \*